United States Patent [19]

Tomiyoshi et al.

[11] Patent Number: 5,137,940
[45] Date of Patent: Aug. 11, 1992

[54] SEMICONDUCTOR ENCAPSULATING EPOXY RESIN COMPOSITIONS

[75] Inventors: Kazutoshi Tomiyoshi, Takasaki; Toshio Shiobara, Annaka; Hatuji Shiraishi, Annaka; Koji Futatsumori, Annaka, all of Japan

[73] Assignee: Shin-Etsu Chemical Co., Ltd., Tokyo, Japan

[21] Appl. No.: 476,700

[22] Filed: Feb. 8, 1990

[30] Foreign Application Priority Data

Feb. 9, 1989 [JP] Japan .................................. 1-30813
Mar. 1, 1989 [JP] Japan .................................. 1-50695

[51] Int. Cl.$^5$ .............................................. C08K 7/08
[52] U.S. Cl. .................................. 523/220; 523/223; 523/443
[58] Field of Search ........................ 523/220, 223, 443

[56] References Cited

U.S. PATENT DOCUMENTS 4,617,330 10/1986 Thai et al. ........................... 523/443
4,701,479 10/1987 Shiobara et al. .................... 523/220

FOREIGN PATENT DOCUMENTS 61-034052 2/1986 Japan .................................. 523/220
61-143466 7/1986 Japan .................................. 523/443
02-032116 2/1990 Japan .................................. 523/443

*Primary Examiner*—Paul R. Michl
*Assistant Examiner*—Edward S. Cain
*Attorney, Agent, or Firm*—Birch, Stewart, Kolasch & Birch

[57] ABSTRACT

A semiconductor encapsulating epoxy resin composition comprising an epoxy resin, a curing agent, and an inorganic filler is improved in melt flow and moldability when the filler comprises spherical silica having a mean particle size of 5 to 35 $\mu$m and a specific surface area of up to 1.4 m$^2$/g. A mixture of (A) spherical silica having a mean particle size of 0.1 to 2 $\mu$m, and (C) ground silica having a mean particle size of 2 to 15 $\mu$m is also useful as the filler. A cured product thereof has a low coefficient of expansion and improved crack resistance upon soldering after moisture absorption.

4 Claims, No Drawings

SEMICONDUCTOR ENCAPSULATING EPOXY RESIN COMPOSITIONS

This invention relates to epoxy resin compositions useful in encapsulating semiconductor devices.

BACKGROUND OF THE INVENTION

Typical of prior art epoxy resin compositions used in encapsulating semiconductor devices are epoxy resin compositions having blended therein a curing agent such as a phenol resin and an inorganic filler such as silica. These epoxy resin compositions are advantageous for encapsulating semiconductor devices. Because of their low melt viscosity and a high melt flow compared with other thermosetting resin compositions such as phenol resin compositions, these epoxy resin compositions are effective in imparting improved moisture resistance to LSI, IC and transistors while minimizing damage to fine patterns and wires thereon.

The recent trend that silicon chips are increased in size and the wiring spacing is minimized imposes a demand for approximating the coefficient of expansion of semiconductor capsulants to that of silicon chips. One approach is to increase the amount of filler blended in the epoxy resin composition to reduce the coefficient of expansion of the cured composition.

On the other hand, a more flowing encapsulant is desired to meet the demand for larger size, multiple pin packages. In general, as the amount of filler increases, the epoxy resin composition flows poorly and is inefficiently molded as often inviting voids and wire flow during molding, resulting in a cured product having poor moisture resistance. There is a need for the development of a semiconductor encapsulating epoxy resin composition having a high flow and moldability and capable of forming a cured product having a low coefficient of expansion.

For epoxy resin compositions comprising an epoxy resin, a curing agent, and an inorganic filler, some approaches are made as by adding a silicone or polybutadiene base modifier to reduce stressing or increasing the amount of inorganic filler blended to reduce the coefficient of expansion. These approaches have some drawbacks although they can reduce stressing. Increasing the amount of inorganic filler blended adversely affects the flow of the composition during molding and the moisture resistance of the cured product upon soldering after moisture absorption. It is difficult to establish a compromise among important functions for encapsulants such as low stressing, moisture resistance upon soldering after moisture absorption, and melt flow.

There is another demand for thinner semiconductor devices as typified by flat packages and SOJ packages. In mounting thin semiconductor devices on printed circuit boards, the presence of moisture in the package could invite water vapor explosion which would induce cracks in the package and gaps at the surface of the silicon chip.

Therefore, there is a need for the development of a semiconductor encapsulating epoxy resin composition exhibiting a high flow upon molding and capable of forming a cured product having low stress and improved soldering resistance, especially moisture resistance and crack resistance after moisture absorption.

SUMMARY OF THE INVENTION

An object of the present invention is to provide a semiconductor encapsulating epoxy resin composition having a high flow and improved moldability and capable of forming a cured product having a low coefficient of expansion. The improved moldability means that the molding composition is free of molding defects such as voids and wire flow.

Another object of the present invention is to provide a semiconductor encapsulating epoxy resin composition exhibiting a high flow upon molding and capable of forming a low-stressing cured product having improved soldering resistance after moisture absorption, especially moisture resistance and crack resistance after moisture absorption and combined treatments including soldering.

The inventors have found that a semiconductor encapsulating epoxy resin composition comprising an epoxy resin, a curing agent, and a filler is improved when spherical silica having a mean particle size of 5 to 35 $\mu$m and a specific surface area of up to 1.4 m$^2$/g is blended as the filler, preferably in an amount of at least 20% by weight, more preferably at least 50% by weight of the entire filler, with the fraction of particles having a particle size of at least 75 $\mu$m being limited up to 1% by weight of the entire filler. Even if the amount of filler blended is increased for the purpose of reducing the coefficient of expansion of a cured product, the composition does not lose fluidity or create molding defects such as voids and wire flow during molding and the resulting cured product has improved moisture resistance. There is thus obtained a semiconductor encapsulating epoxy resin composition having a high flow and improved moldability and capable of curing into a product having a low coefficient of expansion.

According to a first aspect of the present invention, there is provided a semiconductor encapsulating epoxy resin composition comprising an epoxy resin, a curing agent, and a filler, wherein the filler comprises spherical silica having a mean particle size of 5 to 35 $\mu$m and a specific surface area of up to 1.4 m$^2$/g. The fraction of particles having a particle size of at least 75 $\mu$m is up to 1% by weight of the entire filler.

The inventors have made further investigations on the inorganic fillers for semiconductor encapsulating epoxy resin compositions. Several drawbacks of the prior art epoxy resin compositions can be eliminated by using a mixture of (A) spherical silica having a mean particle size of 5 to 35 $\mu$m, (B) spherical silica having a mean particle size of 0.1 to 2 $\mu$m, and (C) ground silica having a mean particle size of 2 to 15 $\mu$m as the inorganic filler, preferably a mixture of 20 to 80% by weight of spherical silica (A), 1 to 20% by weight of spherical silica (B), and 20 to 80% by weight of ground silica (C) based on the total weight of the filler. There is obtained a semiconductor encapsulating epoxy resin composition exhibiting a high flow upon molding and capable of curing into a low-stressing product having improved soldering resistance after moisture absorption.

According to a second aspect of the present invention, there is provided a semiconductor encapsulating epoxy resin composition comprising an epoxy resin, a curing agent, and an inorganic filler, wherein the inorganic filler comprises (A) spherical silica having a mean particle size of 5 to 35 $\mu$m, (B) spherical silica having a mean particle size of 0.1 to 2 $\mu$m, and (C) ground silica having a mean particle size of 2 to 15 $\mu$m.

DETAILED DESCRIPTION OF THE INVENTION

The semiconductor encapsulating epoxy resin composition of the invention contains an epoxy resin, a curing agent, and an inorganic filler.

The epoxy resin used herein is not particularly limited insofar as it has at least two epoxy groups in its molecule. Examples include ortho-cresol novolak type epoxy resins, phenolic novolak type epoxy resins, cycloaliphatic epoxy resins, bisphenol type epoxy resins, substituted or unsubstituted triphenolalkane type epoxy resins, and halogenated ones of the foregoing epoxy resins alone and a mixture of two or more of them. Preferred are cresol novolak type epoxy resins and phenolic novolak type epoxy resins.

The curing agent may be selected in accordance with a particular type of epoxy resin. Amine, acid anhydride, and phenolic novolak curing agents are typical examples. The phenolic novolak curing agents are especially preferred for the moldability and moisture resistance of the epoxy resin composition. Illustrative of the phenolic novolak curing agents are phenolic novolak resins and cresol novolak resins.

The curing agent may be blended in non-limiting amounts. When the curing agent is a phenolic novolak curing agent, it is preferably blended such that the molar ratio of the epoxy group in the epoxy resin to the phenolic hydroxyl group in the curing agent may range from 2:1 to 2:3.

A curing accelerator may preferably be blended in the composition for promoting reaction between the epoxy resin and the curing agent. Examples of the curing accelerator include imidazoles, undecene compounds such as 1,8-diazabicyclo(5.4.0)undecene-7 (DBU), phosphine compounds such as triphenylphosphine, tertiary amines, and cycloamidines alone and a mixture thereof. The amount of curing accelerator blended is not particularly limited and it may be used in an effective amount.

Further, a silicone polymer may preferably be blended in the epoxy resin composition of the invention for the purpose of reducing the stress thereof. With the silicone polymer added, the cured product shows the minimized occurrence of package cracks in a thermal shock test. Examples of the silicone polymer include silicone oils, silicone resins and silicone rubbers each having an epoxy, amino, carboxyl, hydroxyl, hydrosilyl or vinyl group, and copolymers of these silicone polymers with organic polymers such as phenolic novolak resins and epoxidized phenolic novolak resins.

The silicone polymer may be blended in amounts of 1 to 50 parts by weight per 100 parts by weight of the total of epoxy resin and curing agent.

According to the present invention, a specific silica filler is blended as the inorganic filler in the semiconductor encapsulating epoxy resin composition which contains the epoxy resin and the curing agent as essential components and the curing accelerator as an optional component as described above.

The filler used herein has a fraction of particles having a particle size of at least 75 μm which should be limited up to 1%, preferably up to 0.5% by weight of the entire filler, and the filler comprises a specific spherical silica as defined below. The spherical silica used herein has a mean particle size of 5 to 35 μm, preferably 8 to 32 μm and a specific surface area of up to 1.4 cm$^2$/g, preferably 0.4 to 1 m$^2$/g, with the fraction of those silica particles having a particle size of 75 μm or larger being up to 2%, preferably up to 1% by weight of the entire spherical silica.

If more than 1% by weight of coarse particles having a particle size of at least 75 μm are present in the entire filler, the cured product would cause more damage to the semiconductor chip surface resulting in a loss of moisture resistance. If the mean particle size of spherical silica is less than 5 μm, the cured product shows poor crack resistance upon thermal cycling. If the mean particle size of spherical silica is more than 35 μm, wire flow would occur during molding. Spherical silica having a specific surface area of more than 1.4 m$^2$/g results in a less flowing composition.

The spherical silica may be obtained by a variety of methods including melting of natural quartz, hydrolysis or heat melting of purified chlorosilane or alkoxysilane, and sol-gel methods.

In the practice of the invention, the spherical silica as defined above may be used alone as the filler. As long as the low coefficient of expansion and high flow of the composition are not adversely affected, any other species of silica such as ground fused silica, spherical silica having a specific surface area of more than 1 m$^2$/g, and fumed silica may be added along with the spherical silica as defined above. In such a case, the specific spherical silica may be blended in a major amount of at least 20% by weight, preferably at least 50% by weight of the total weight of the fillers because minor amounts would sometimes result in a composition which is less flowing and less moldable.

In the second aspect of the invention, a mixture of (A) spherical silica having a mean particle size of 5 to 35 μm, preferably 8 to 32 μm, (B) spherical silica having a mean particle size of 0.1 to 2 μm, preferably 0.5 to 1.5 μm, and (C) ground silica having a mean particle size of 2 to 15 μm, preferably 3 to 12 μm is used as the filler. The use of these three species of silica provides an epoxy resin composition meeting both fluidity and soldering resistance after moisture absorption and affording a low-stressing cured product.

Spherical silica (A) preferably has a specific surface area of up to 2.5 m$^2$/g, more preferably 0.4 to 1.4 m$^2$/g because the composition is further improved in fluidity. The spherical silica previously defined in connection with the first aspect is most preferred. The amount of spherical silica (A) blended is in the range of from 20 to 80%, especially 20 to 75% by weight based on the weight of the entire inorganic filler. Compositions with the filler containing less than 20% by weight of spherical silica (A) would sometimes show poor flow whereas compositions with the filler containing more than 80% by weight of spherical silica (A) would sometimes show poor soldering resistance after moisture absorption.

Spherical silica (B) is effective in improving the flow of the composition when added along with spherical silica (A). Spherical silica (B) preferably has a specific surface area of up to 15 m$^2$/g, more preferably 4 to 10 m$^2$/g because the composition is further improved in fluidity. The amount of spherical silica (B) blended is in the range of from 1 to 20%, especially 5 to 15% based on the weight of the entire inorganic filler. Compositions with the filler containing less than 1% by weight of spherical silica (B) would sometimes show insufficient flow whereas compositions with the filler containing more than 20% by weight of spherical silica (B) would sometimes show poor soldering resistance after moisture absorption.

Ground silica (C) is effective in improving the soldering properties of a cured product after moisture absorption without detracting from the flow of the composition. The ground silica is not particularly limited insofar as it has a mean particle size of 2 to 15 μm. Preferably, the ground silica is obtained by finely dividing spherical silica.

The spherical silica from which ground silica (C) is prepared is not particularly limited although spherical silica particles having a mean particle size of 20 to 50 μm and spherical silica particles having a particle size of at least 75 μm are preferred. These spherical silica particles may be finely divided by any of commonly used methods although ball milling is preferred. It will be understood that the ground silica obtained by milling spherical silica is a mass containing spherical silica particles whose surface is roughened, semi-spherical pieces resulting from division of particles, semi-spherical pieces having rounded edges, and other irregular shape pieces.

The amount of ground silica (C) blended is in the range of from 20 to 80%, especially 20 to 75% by weight based on the weight of the entire inorganic filler. Compositions with the filler containing less than 20% by weight of ground silica (C) would sometimes show poor soldering resistance of a cured product after moisture absorption whereas compositions with the filler containing more than 80% by weight of ground silica (C) would sometimes show poor flow.

In addition to the silica mixture defined above, any desired inorganic fillers such as glass fibers may be blended in the present composition insofar as the objects of the invention are properly achieved.

The silica and other inorganic fillers may be surface treated with coupling agents such as γ-glycidoxypropyltrimethoxysilane in a conventional manner before they are blended in the composition.

In the preferred composition of the invention, 250 to 700 parts, especially 300 to 550 parts by weight of the filler is present per 100 parts by weight of the total of the epoxy resin and the curing agent.

In addition to the above-mentioned components, the composition of the invention may further contain any of various well-known additives if desired. Such additives include release agents, for example, waxes such as carnauba wax and fatty acids such as stearic acid and metal salts thereof; pigments such as carbon black, cobalt blue, and red iron oxide; flame retardants such as antimony oxide and halides; coupling agents such as epoxysilane, vinylsilane, boron compounds, and alkyltitanates; antioxidants and the like alone or a mixture thereof.

The epoxy resin composition of the invention may be prepared, for example, by evenly mixing amounts of the necessary components as mentioned above, milling the mixture in milling means pre-heated to 70 to 95° C. such as a kneader, roll mill and extruder, cooling the mixture, and comminuting the mixture. One preferred method is melt mixing using a mixing roll or extruder. The order of mixing the components is not critical.

The epoxy resin composition of the invention is most often used in encapsulating semiconductor devices such as IC, LSI, transistors, thyristors, and diodes as well as manufacturing printed circuit boards.

Semiconductor devices may be encapsulated with the composition by any well-known molding methods including transfer molding, injection molding, and casting. Most often, the epoxy resin composition is molded at temperatures of 150 to 180° C. and post cured at temperatures of 150 to 180° C. for 2 to 16 hours.

EXAMPLE

Examples of the invention are given below by way of illustration and not by way of limitation. Unless otherwise stated, all parts and percents are by weight.

EXAMPLES 1-4 AND COMPARATIVE EXAMPLES 1-5

A base composition was prepared by blending 58 parts of an epoxidized cresol novolak resin having an epoxy equivalent of 200 and a softening point of 65° C., 6 parts of brominated epoxidized phenol novolak resin having an epoxy equivalent of 280, 36 parts of a phenol novolak resin having a phenol equivalent of 110 and a softening point of 80° C., 0.7 parts of triphenylphosphine, 10 parts of antimony trioxide, 1.5 parts of carnauba wax, 1.6 parts of γ-glycidoxypropyltrimethoxysilane, and 1 part of carbon. Epoxy resin compositions were prepared by blending the base composition with the different types of silica shown in Table 1 in the amounts shown in Table 2, the silica being surface treated with 0.6% of 7.glycidoxypropyltrimethoxysilane. The blend was melt mixed in a mixing roll at 80° C. for 5 minutes, dispensed in sheet form, cooled down, and comminuted.

The thus obtained compositions were subjected to the following tests.

The results are also shown in Table 2.

(i) Spiral Flow

The spiral flow was measured at 175° C. and 70 kgf/cm$^2$ using a mold according to the EMMI standard.

(ii) Coefficient of Expansion

A test piece of 5×5×5 mm was molded at 175° C. for 2 minutes and post cured at 180° C. for 4 hours. The test piece was measured for coefficient of expansion using an Agne tester (Sinku Riko K.K.) while it was heated at a rate of 5° C./min. over the range of from 25° C. to 250° C.

(iii) Charging Defect

A 64-pin, 600 mil DIP frame was encapsulated with the composition at 175° C., 70 kgf/cm$^2$ and a preheat temperature of 85° C. The moldings were examined for voids and those moldings having voids of 0.5 mm or larger were rejected.

(iv) Wire Flow

A 100-pin flat package frame of 14×20×2.7 mm (thick) was encapsulated with the composition at 175° C., 70 kgf/cm$^2$ and a preheat temperature of 85° C. Gold wire flow was observed by soft x-ray analysis. Little flow was rated "O", some flow was rated "Δ", and substantial flow was rated "X."

(v) Moisture Resistance

A test chip having a minimum wire spacing of 1.5 μm and a size of 45 m$^2$ was used. Evaluation was made using a 14-pin DIP semiconductor device. The composition was molded at 175° C. for 2 minutes and post cured at 180° C. for 4 hours, immersed in a solder bath at 260° C. for 10 seconds, and allowed to stand in a pressure cooker at 130° C. for 1,000 hours. Percent breakage of aluminum wires was determined.

TABLE 1

| | Particle size distribution | | | Mean particle size | Specific surface area (BET) | Shape | Remarks |
|---|---|---|---|---|---|---|---|
| | $\geq 75\ \mu m$ | $44-75\ \mu m$ | $\leq 12\ \mu m$ | | | | |
| Silica 1 | 1% | 28% | 13% | 31 $\mu m$ | 0.5 $m^2/g$ | sphere | Invention |
| Silica 2 | <0.1% | 11% | 30% | 15 $\mu m$ | 0.9 $m^2/g$ | sphere | Invention |
| Silica 3 | <0.1% | 6% | 38% | 8 $\mu m$ | 1.0 $m^2/g$ | sphere | Invention |
| Silica 4 | 0.3% | 14% | 28% | 16 $\mu m$ | 1.4 $m^2/g$ | sphere | Invention |
| Silica 5 | 5% | 26% | 14% | 30 $\mu m$ | 0.5 $m^2/g$ | sphere | Comparison |
| Silica 6 | 1% | 24% | 27% | 31 $\mu m$ | 3.0 $m^2/g$ | sphere | Comparison |
| Silica 7 | <0.1% | 22% | 20% | 23 $\mu m$ | 3.5 $m^2/g$ | sphere | Comparison |
| Silica 8 | <0.1% | 2% | 93% | 3 $\mu m$ | 1.5 $m^2/g$ | sphere | Comparison |
| Silica 9 | <0.1% | 7% | 35% | 12 $\mu m$ | 3.0 $m^2/g$ | non-sphere (ground) | Comparison |

Particle size measured by CILAS Granulometer HR850

TABLE 2

| | Example | | | | Comparative Example | | | | |
|---|---|---|---|---|---|---|---|---|---|
| | 1 | 2 | 3 | 4 | 1 | 2 | 3 | 4 | 5 |
| Amount of silica blended (pbw) | | | | | | | | | |
| Silica 1 (Invention) | 320 | — | — | — | — | — | — | — | — |
| Silica 2 (Invention) | — | 320 | — | — | — | — | — | — | — |
| Silica 3 (Invention) | — | — | 320 | — | — | — | — | — | — |
| Silica 4 (Invention) | — | — | — | 320 | — | — | — | — | — |
| Silica 5 (Comparison) | — | — | — | — | 320 | — | — | — | — |
| Silica 6 (Comparison) | — | — | — | — | — | 320 | — | — | — |
| Silica 7 (Comparison) | — | — | — | — | — | — | 320 | — | — |
| Silica 8 (Comparison) | — | — | — | — | — | — | — | 320 | — |
| Silica 9 (Comparison) | 80 | 80 | 80 | 80 | 80 | 80 | 80 | — | 400 |
| Properties | | | | | | | | | |
| Spiral flow (cm) | 90 | 91 | 89 | 90 | 88 | 60 | 56 | 62 | 40 |
| Coefficient of expansion ($10^{-5}/°C.$) [50–100° C.] | 1.2 | 1.2 | 1.2 | 1.2 | 1.2 | 1.2 | 1.2 | 1.3 | 1.2 |
| Charging defect (%) | 0.01 | 0.01 | 0.01 | 0.01 | 0.03 | 0.10 | 0.11 | 0.12 | 0.15 |
| Wire flow | ○ | ○ | ○ | ○ | Δ | X | X | X | X |
| Moisture resistance, wire breakage (%) | 0 | 0 | 0 | 0 | 10 | 0 | 5 | 2 | 5 |

As seen from Table 2, the epoxy resin compositions having blended therein spherical silicas according to the invention (Examples 1–4) show least voids and little wire flow during molding, that is, improved moldability and cure into products having a low coefficient of expansion and high moisture resistance. In contrast, the epoxy resin compositions in which the content of particles having a particle size of at least 75 $\mu m$ or the mean particle size or specific surface area of spherical silica is outside the scope of the invention (Comparative Examples 1–5) show more voids and substantial wire flow and cure into products having poor moisture resistance.

EXAMPLES 5–11

A base composition was prepared by blending 100 parts of an epoxidized cresol novolak resin having an epoxy equivalent of 198 and a softening point of 60° C., 6 parts of brominated epoxidized phenol novolak resin having an epoxy equivalent of 280, 33 parts of a phenol novolak resin having a phenol equivalent of 110 and a softening point of 90° C., 25 parts of a reaction product from 60 parts of a compound of the formula:

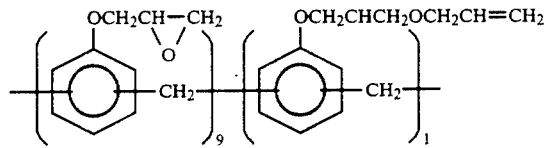

and 40 parts of a compound of the formula:

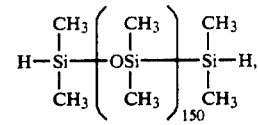

0.65 parts of triphenylphosphine, 10 parts of antimony trioxide, 1.2 parts of carnauba wax, 1.5 parts of γ-glycidoxypropyltrimethoxysilane, and 1 part of carbon. Compositions were prepared by blending the base composition with the different types of silica shown in Table 3 in the amounts shown in the same Table and working up the mixtures as in Example 1.

The compositions were subjected to the same tests as in Example 1 with the results shown in Table 3.

TABLE 3

| | Example | | | | | | |
|---|---|---|---|---|---|---|---|
| | 5 | 6 | 7 | 8 | 9 | 10 | 11 |
| Amount of silica blended (pbw) | | | | | | | |
| Silica 10* (Invention) | 380 | 285 | 190 | 190 | 450 | 500 | 500 |
| Silica 7 (Comparison) | — | — | — | 190 | — | — | — |

TABLE 3-continued

|  | Example | | | | | | |
|---|---|---|---|---|---|---|---|
|  | 5 | 6 | 7 | 8 | 9 | 10 | 11 |
| Silica 9 (Comparison) | — | 95 | 190 | — | — | — | — |
| Silica 11* (Comparison) | — | — | — | — | — | 50 | — |
| Properties | | | | | | | |
| Spiral flow (cm) | 95 | 90 | 85 | 88 | 80 | 78 | 77 |
| Coefficient of expansion ($10^{-5}$/°C.) [50–100° C.] | 1.2 | 1.2 | 1.2 | 1.2 | 1.0 | 0.9 | 0.8 |
| Charging defect (%) | 0.01 | 0.01 | 0.01 | 0.01 | 0.01 | 0.02 | 0.02 |
| Wire flow | ○ | ○ | ○ | ○ | ○ | ○ | ○ |
| Moisture resistance, wire breakage (%) | 0 | 0 | 0 | 0 | 0 | 0 | 0 |

Note:
*Silica 10: spherical silica having mean particle size 20 μm, particle size distribution 75 μm or larger fraction 0.1% by weight, 44–75 μm fraction 7% by weight, up to 12 μm fraction 10% by weight, specific surface area 0.8 m²/g
*Silica 11: spherical silica having mean particle size 0.5 μm As seen from Table 3, the epoxy resin compositions in which the spherical silica within the scope of the invention is blended in amounts of at least 50% of the entire filler cure into products having a low coefficient of expansion and high moisture resistance. Occurrence of voids and wire flow during molding is minimized, that is, moldability is maintained even when the amount of filler blended is increased.

EXAMPLES 12–16 AND COMPARATIVE EXAMPLES 6–9

A base composition was prepared by blending 58 parts of an epoxidized cresol novolak resin having an epoxy equivalent of 200 and a softening point of 65° C., 6 parts of brominated epoxidized phenol novolak resin having an epoxy equivalent of 280, 36 parts of a phenol novolak resin having a phenol equivalent of 110 and a softening point of 80° C., 0.7 parts of triphenylphosphine, 10 parts of antimony trioxide, 1.5 parts of carnauba wax, 1.6 parts of γ-glycidoxypropyltrimethoxysilane, and 1 part of carbon. Epoxy resin compositions were prepared by blending the base composition with the silica mixtures shown in Table 4. The blend was melt mixed in a mixing roll at 80° C. for 5 minutes, dispensed in sheet form, cooled down, and comminuted.

The compositions were subjected to the following tests.

The results are also shown in Table 4.

(i) Spiral Flow

The spiral flow was measured at 175° C. and 70 kgf/cm² using a mold according to the EMMI standard.

(ii) Coefficient of Expansion and Glass Transition Temperature

A test piece of 5×5×5 mm was molded at 175° C. for 2 minutes and post cured at 180° C. for 4 hours. The test piece was measured for coefficient of expansion and glass transition temperature (Tg) using an Agne tester (Sinku Riko K.K.) while it was heated at a rate of 5° C./min. over the range of from 25° C to 250° C.

(iii) Flexural Strength

A tensile test bar according to JIS K-6911 was molded from the composition at 175° C. and 70 kg/cm² for 2 minutes and post cured at 180° C. for 4 hours. The bar was measured for flexural strength at room temperature. The bar was further kept in a pressure cooker (PC) at 121° C. and 100% for 24 hours. The PC treated bar was also measured for flexural strength.

(iv) Crack Resistance Upon Soldering After Moisture Absorption

A flat package having dimensions of 14×20×2.3 mm (thick) and an island area of 8×10 mm was encapsulated with the composition at 175° C. for 2 minutes and post cured at 180° C. for 4 hours. The package was allowed to stand in a constant temperature/constant humidity tank at 85° C. and RH 85% and then immersed in a solder bath at 260° C. to measure the time taken until cracks occurred in the package.

TABLE 4

|  | Shape | Mean particle size | Specific surface area | Example | | | | | Comparative Example | | | |
|---|---|---|---|---|---|---|---|---|---|---|---|---|
|  |  |  |  | 12 | 13 | 14 | 15 | 16 | 6 | 7 | 8 | 9 |
|  |  |  |  | Amount of silica blended (pbw) | | | | | | | | |
| Silica 12 | sphere | 30 μm | 0.5 m²/g | 160 | — | — | 160 | — | 352 | 320 | 192 | — |
| Silica 13 | sphere | 23 μm | 2.2 m²/g | — | 160 | — | — | 160 | — | — | — | — |
| Silica 14 | sphere | 15 μm | 0.8 m²/g | — | — | 160 | — | — | — | — | — | — |
| Silica 15 | sphere | 0.5 μm | 8.0 m²/g | 32 | 32 | 32 | — | 32 | — | 32 | — | — |
| Silica 16 | sphere | 1.5 μm | 14.2 m²/g | — | — | — | 32 | — | — | — | — | — |
| Silica 17* | ground | 5 μm | — | 160 | 160 | 160 | 160 | — | — | — | 160 | — |
| Silica 18* | ground | 10 μm | — | — | — | — | — | 160 | — | — | — | — |
| Silica 19* | ground | 15 μm | — | — | — | — | — | — | — | — | — | 352 |
| Properties | | | | | | | | | | | | |
| Spiral flow (cm) | | | | 105 | 85 | 102 | 83 | 85 | 90 | 108 | 65 | 50 |
| Coefficient of expansion ($10^{-5}$/°C.) | | | | 1.5 | 1.5 | 1.5 | 1.5 | 1.5 | 1.5 | 1.5 | 1.5 | 1.5 |
| Tg (°C.) | | | | 165 | 167 | 166 | 170 | 165 | 165 | 164 | 165 | 166 |
| Flexural strength | | | | | | | | | | | | |
| room temp. (kg/cm²) | | | | 13.0 | 13.5 | 13.2 | 13.0 | 13.8 | 13.0 | 13.2 | 13.4 | 13.0 |
| PC treated (kg/cm²) | | | | 11.0 | 11.5 | 10.8 | 10.7 | 10.6 | 8.0 | 9.0 | 8.8 | 10.8 |

TABLE 4-continued

| | | | Example | | | | | Comparative Example | | |
|---|---|---|---|---|---|---|---|---|---|---|
| Shape | Mean particle size | Specific surface area | 12 | 13 | 14 | 15 | 16 | 6 | 7 | 8 | 9 |
| | | | Amount of silica blended (pbw) | | | | | | | |
| Crack resistance (min.) | | | ≧30 | ≧30 | ≧30 | ≧30 | ≧30 | 8 | 9 | ≧30 | 23 |

*Silica 17: ground silica obtained by finely dividing spherical silica having a particle size of at least 75 μm in a ball mill for 2 hours, having a mean particle size of 5 μm, with the fraction of coarse particles of at least 48 μm in size being up to 0.1%.
*Silica 18: ground silica obtained by finely dividing spherical silica having a mean particle size of 30 μm in a ball mill for 1 hours, having a mean particle size of 10 μm, with the fraction of coarse particles of at least 75 μm in size being up to 0.1%.
*Silica 19: ground silica having a mean particle size of 15 μm As seen from Table 4, the epoxy resin compositions which lack any one of the three types of spherical and ground silicas within the scope of the invention (Comparative Examples 6-9) are poor in flow, flexural strength after PC treatment, or crack resistance upon soldering. The epoxy resin compositions within the scope of the invention are excellent in all these properties, that is, they exhibit less stress, good flow during molding, and high soldering resistance after moisture absorption.

EXAMPLES 17-21 AND COMPARATIVE EXAMPLES 10-11

A series of epoxy resin compositions were prepared by using the same base composition and following the same procedure as in Example 12 except that the silica shown in Table 5 was used. The compositions were tested as in Example 4.

The results are shown in Table 5.

TABLE 5

| | Shape | Mean particle size | Specific surface area | Example | | | | | Comparative Example | |
|---|---|---|---|---|---|---|---|---|---|---|
| | | | | 17 | 18 | 19 | 20 | 21 | 10 | 11 |
| | | | | Amount of silica blended (pbw) | | | | | | |
| Silica 20* | sphere | 23 μm | 2.2 m²/g | 80 | 200 | 300 | 220 | 140 | 200 | 200 |
| Silica 21* | sphere | 0.5 μm | 8.0 m²/g | 40 | 40 | 20 | 60 | 20 | — | 40 |
| Silica 22* | ground | 5 μm | — | 280 | 160 | 80 | 220 | 140 | 160 | — |
| Silica 23* | sphere | 4 μm | — | — | — | — | — | — | 40 | — |
| Silica 24* | ground | 1 μm | — | — | — | — | — | — | — | 160 |
| Properties | | | | | | | | | | |
| Spiral flow (cm) | | | | 65 | 70 | 75 | 62 | 100 | 55 | 58 |
| Coefficient of expansion ($10^{-5}$/°C.) | | | | 1.2 | 1.2 | 1.2 | 1.0 | 1.8 | 1.2 | 1.2 |
| Tg (°C.) | | | | 167 | 166 | 167 | 170 | 163 | 165 | 165 |
| Flexural strength | | | | | | | | | | |
| room temp. (kg/cm²) | | | | 13.8 | 13.5 | 13.0 | 13.6 | 13.6 | 13.0 | 13.6 |
| PC treated (kg/cm²) | | | | 10.8 | 10.3 | 10.2 | 12.0 | 11.0 | 10.0 | 10.0 |
| Crack resistance (min.) | | | | ≧30 | ≧30 | ≧30 | ≧30 | 28 | 28 | 12 |

Note:
*Silica 20: spherical silica obtained by surface treating Silica 13 with 0.6% by weight of γ-glycidoxypropyltrimethoxysilane (KBM 403, manufactured by Shin-Etsu Chemical Co., Ltd.).
*Silica 21: spherical silica obtained by surface treating Silica 15 with 1.0% by weight of KBM 403.
*Silica 22: spherical silica obtained by surface treating Silica 17 with 0.8% by weight of KBM 403.
*Silica 23: spherical silica obtained by surface treating spherical silica having a means particle size of 4 μm with 0.9% by weight of γ-glycidoxypropyltrimethoxysilane.
*Silica 24: ground silica having a mean particle size of 1 μm obtained by finely dividing spherical silica having a mean particle size of 30 μm in a ball mill for 3 hours.

The data of Table 5 also demonstrate that the compositions within the scope of the invention are improved in flow, flexural strength after PC treatment, and crack resistance upon soldering.

Although some preferred embodiments have been described, many modifications and variations may be made thereto in the light of the above teachings. It is therefore to be understood that within the scope of the appended claims, the invention may be practiced otherwise than as specifically described.

We claim:

1. A semiconductor encapsulating epoxy resin composition comprising an epoxy resin, a curing agent, and an inorganic filler, the improvement wherein the inorganic filler comprises (A) spherical silica having a mean particle size of 5 to 35 μm, (B) spherical silica having a mean particle size of 0.1 to 2 μm, and (C) ground silica having a mean particle size of 2 to 15 μm.

2. The composition of claim 1 wherein the ground silica is obtained by finely dividing spherical silica.

3. The composition of claim 1 wherein
250 to 700 parts by weight of the filler is present per 100 parts by weight of the total of the epoxy resin and the curing agent, and
the filler comprises (A) 20 to 80% by weight of spherical silica having a mean particle size of 5 to 35 μm, (B) 1 to 20% by weight of spherical silica having a mean particle size of 0.1 to 2 μm, and (C) 20 to 80% by weight of ground silica based on the total weight of the filler.

4. A cured product which is obtained by the process of curing an epoxy resin composition as set forth in any one of claims 1 to 3.

* * * * *